Dec. 23, 1969    J. M. BAILEY ET AL    3,485,225
ROTARY DISTRIBUTOR FUEL PUMP
Filed April 15, 1968    4 Sheets-Sheet 1
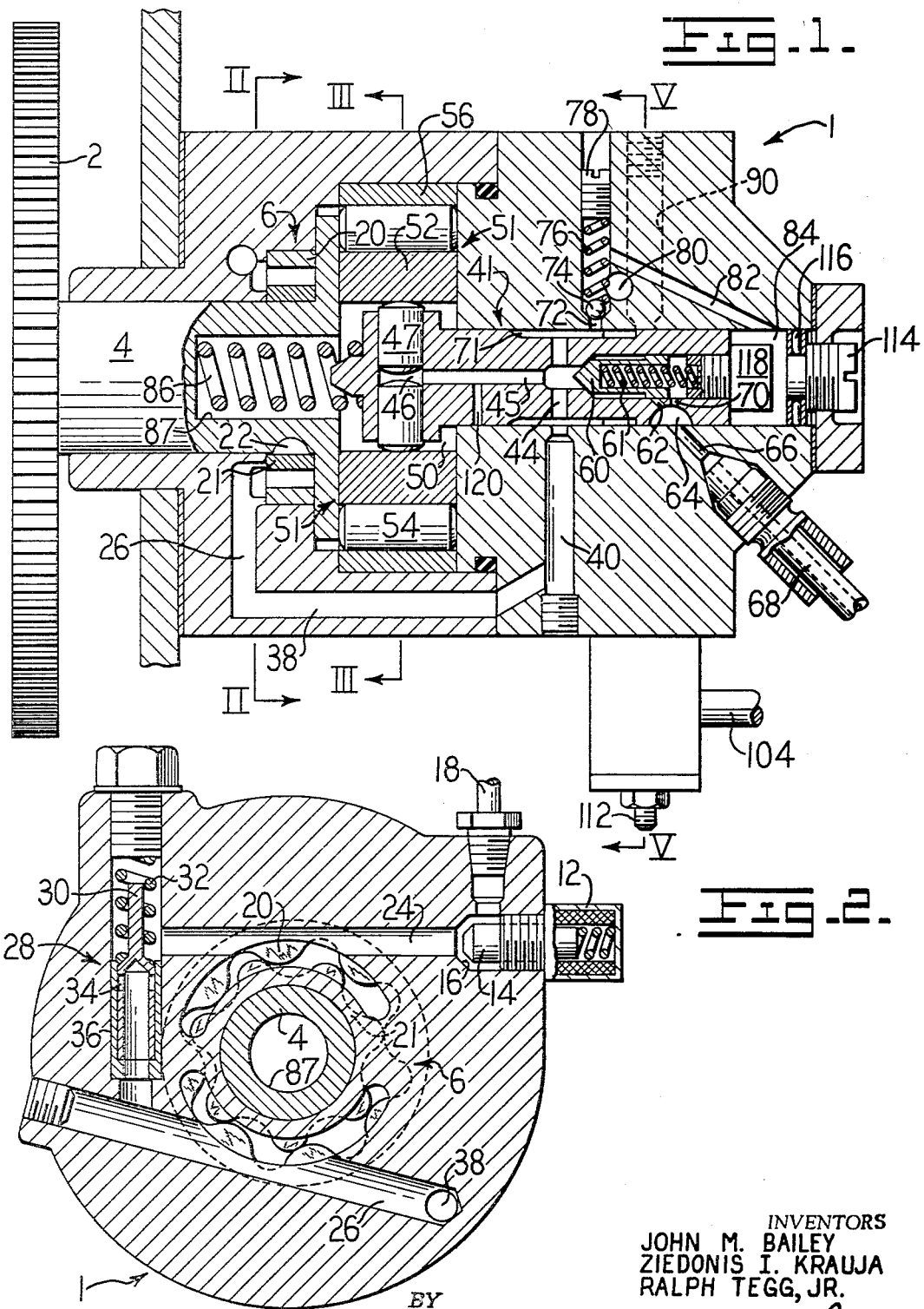
INVENTORS
JOHN M. BAILEY
ZIEDONIS I. KRAUJA
RALPH TEGG, JR.
BY
ATTORNEYS

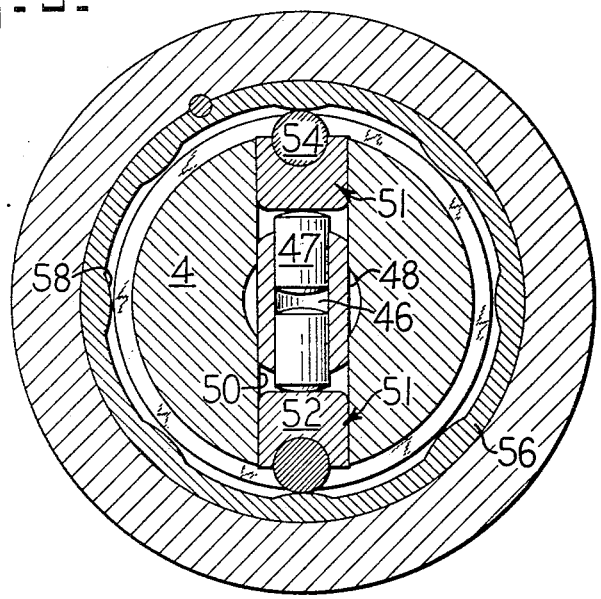
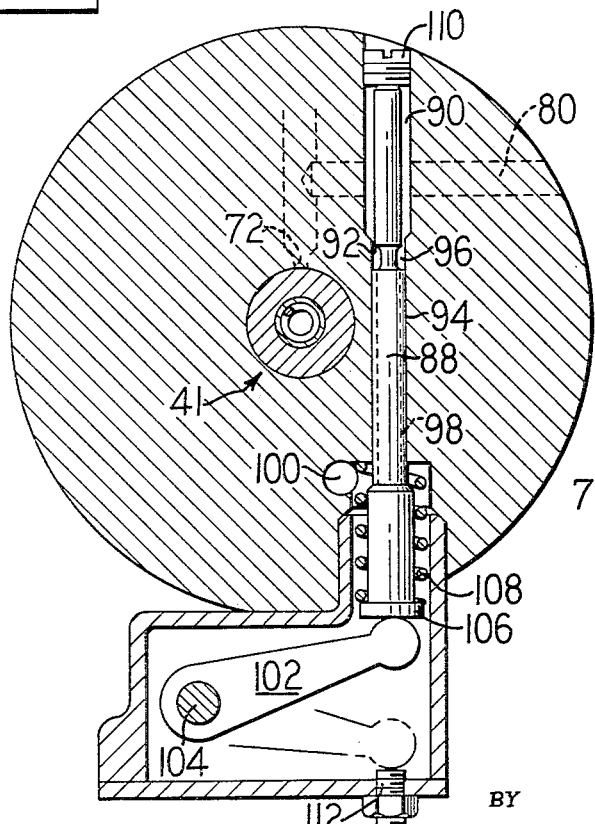
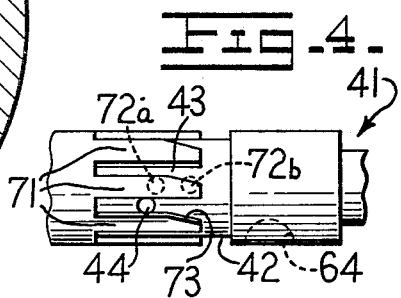

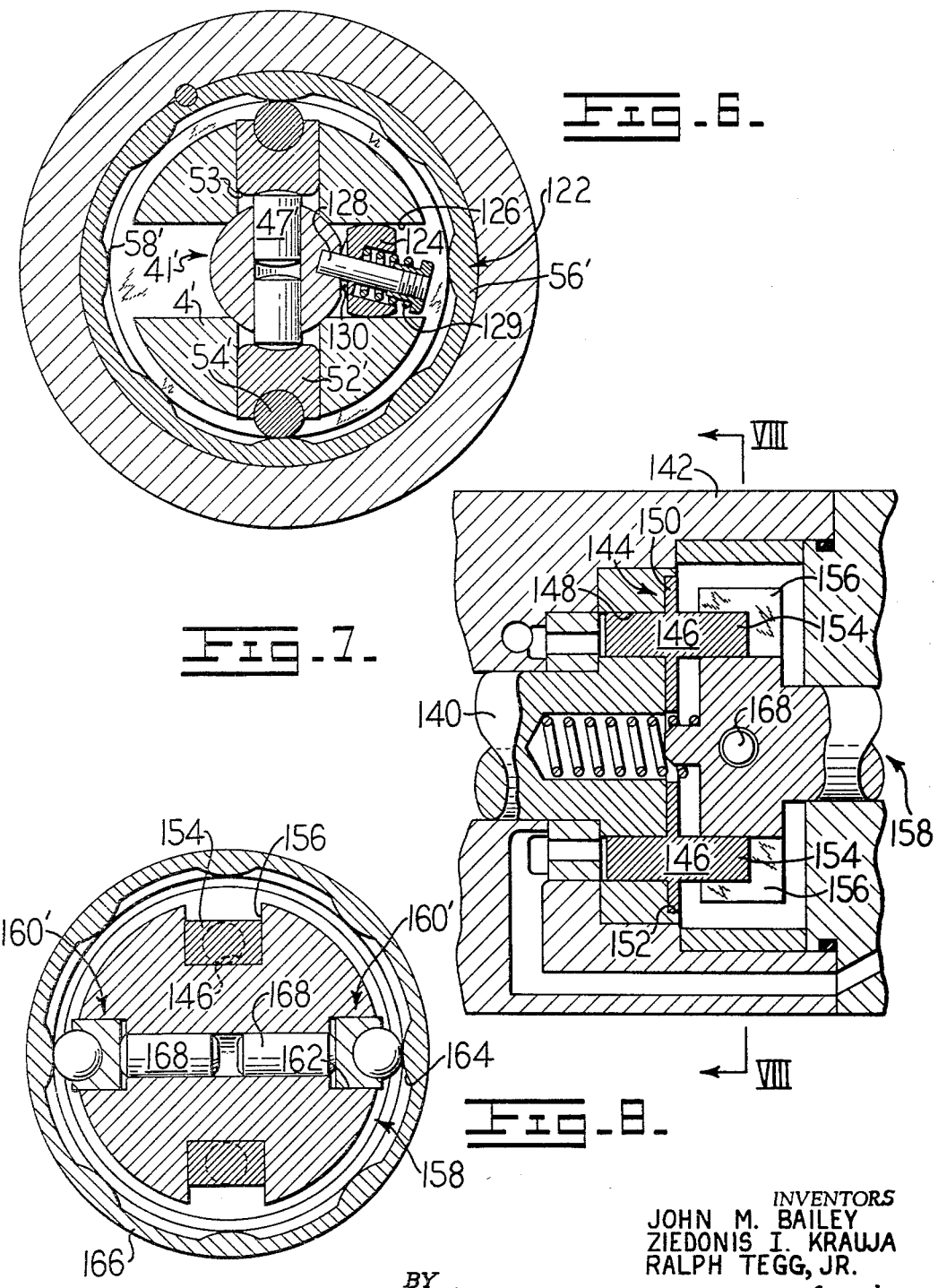

INVENTORS
JOHN M. BAILEY
ZIEDONIS I. KRAUJA
RALPH TEGG, JR.

ATTORNEYS

United States Patent Office 3,485,225
Patented Dec. 23, 1969

3,485,225
ROTARY DISTRIBUTOR FUEL PUMP
John M. Bailey, Dunlap, Ziedonis I. Krauja, East Peoria, and Ralph Tegg, Jr., Peoria, Ill., assignors to Caterpillar Tractor Co., Peoria, Ill., a corporation of California
Filed Apr. 15, 1968, Ser. No. 721,255
Int. Cl. F02m 39/00; F04b 13/00
U.S. Cl. 123—139                                7 Claims

ABSTRACT OF THE DISCLOSURE

A rotary distributor fuel pump for a multicylinder internal combustion engine is provided with a rotor which rotates to meter fuel to the engine cylinders, axially reciprocates to govern engine speed, and can be rotatably advanced and retarded to provide variable timing for fuel injection to said engine cylinders.

Background of the invention

This invention relates to a distributor type fuel pump having opposed reciprocating plungers mounted within a rotor which provides for metering, distributing, governing and timing of fuel delivery to an internal combustion engine.

The invention is principally directed to a rotary distributor type fuel injection pump which considerably reduces the cost of such a pump over presently existing prior art structures while simultaneously maintaining or even gaining performance and reduced wear characteristics.

One of the objects of this invention is to provide a variable delivery fuel pump which is composed of a relatively small number of parts and is therefore relatively inexpensive to manufacture.

One of the chief advantages of the invention resides in the feature of using the rotor both as a distributing and metering element as well as a hydraulic governing device for controlling engine speed.

Another object of the invention is the provision of an extremely simplified governing system which provides accurate governing without the use of such prior art elements as complex gears, linkages, etc.

Still another object and advantage of the present invention resides in the fact that the pump construction is extremely simple and easily lends itself to the incorporation of such features as variable timing, etc.

Yet another object of the invention is the provision of a new and improved fuel supply unit which includes a fuel supply pump, a fuel injection pump, governor and fuel distributor, and wherein all of said elements are combined into a relatively simple, compact, inexpensive unit.

Another object of the invention is to provide such a device which is of the spill or by-pass type and controls the quantity of fuel delivered by controlling the quantity of fuel by-passed or spilled.

Still another object of the persent invention is to provide a device of the type set forth wherein the supply pump, injection pump, governor and fuel distributor are all inter-related for control by the pump drive shaft.

A further object of the invention is to provide new and improved arrangements for controlling the timing of fuel injection.

Other objects and advantages of the present invention will be apparent from the following description and claims and are illustrated in the accompanying drawings which, by way of illustration, show preferred embodiments of the present invention and the principles thereof and what is now considered to be the best mode contemplated for applying these principles. It is recognized that other embodiments of the invention embodying the same or equivalent principles may be used and structural changes may be made as desired by those skilled in the art without departing from the present invention and the purview of the appended claims.

Brief description of the drawings

FIGURE 1 is a longitudinal section taken through the complete pump illustrating the major components of the invention and their general relationship;

FIGURE 2 is a cross-sectional view taken on the line II—II of FIGURE 1;

FIGURE 3 is a cross-sectional view taken on the line III—III of FIGURE 1;

FIGURE 4 is an elevation of the rotor component of the instant invention and illustrates the general arrangement of scrolls on that component;

FIGURE 5 is another cross-sectional view taken on the line V—V of FIGURE 1;

FIGURE 6 is a cross-sectional view similar to FIGURE 3 illustrating an alternate rotor drive arrangement which provides a mechanical timing advance mechanism for the subject fuel pump;

FIGURE 7 is a partial longitudinal section view of a modified embodiment of the fuel pump illustrating the driving components thereof;

FIGURE 8 is a cross-sectional view taken on the line VIII—VIII of FIGURE 7;

Referring to FIGURES 1 and 2, the fuel pump shown generally at 1, is driven from the engine timing gear train through a gear 2. The gear 2 is suitably connected to a drive member 4 which transmits drive to an internal gear fuel transfer pump, generally indicated at 6.

Figure 9:
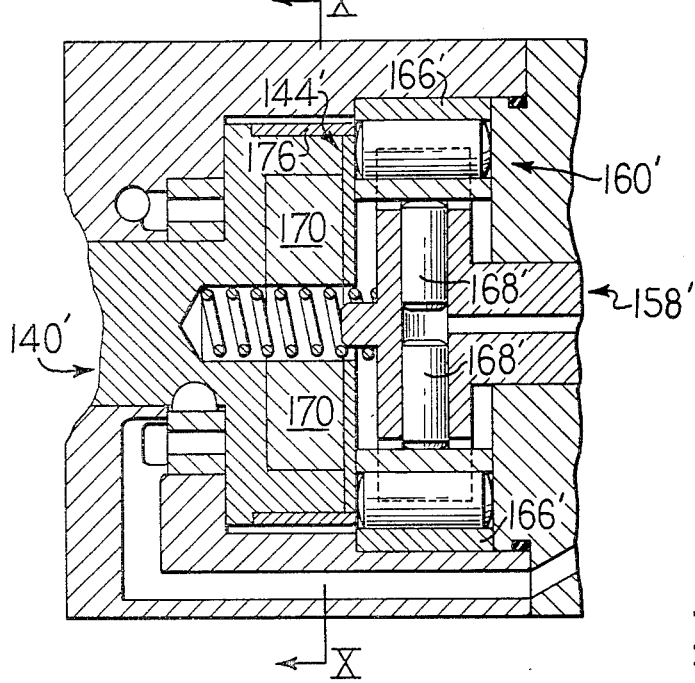
FIGURE 9 is a longitudinal section view similar to FIGURE 7 illustrating yet another modified embodiment of the present invention.

During operation of the fuel pump, a solenoid controlled valve 12 is activated by a switch (not shown) controlled by the operator to move a valve plunger 14 from its seat 16. This opens a fuel line 18 which allows fuel to flow from a fuel tank (not shown) into the transfer pump 6. Transfer pump members 20 and 21 are rotatably driven by member 4 through a key 22 to effect fuel transfer from line 18 and a passage 24 over to a passage 26.

A predetermined pressure is maintained in passage 26 by means of a spring biased pressure relief valve generally indicated at 28. Should the pressure in passageway 26 exceed a predetermined value, a valve spool 30 will overcome the force of the spring 32 and relieve pressure fluid when plunger ports 34 pass the end of an insert 36. As best shown in FIGURE 1, pressure fluid flows from the passage 26 to a passage 38 and then to a passage 40.

Referring now to FIGURE 4 in conjunction with FIGURE 1, there is shown a rotor, generally indicated at 41, which is provided near its mid portion with an annular groove 42. The groove 42 communicates with a plurality of slots 43 which are separated by a plurality of axially extending scrolls 71 whose function will be described in greater detail, infra.

A bore 44 extends radially through the rotor 41 between a pair of the slots 43. Thus, it will be understood that upon rotation of the rotor 41 fuel will be allowed to flow from the passage 40 into the radial bore 44 during those periods when the passage 40 is not blocked by one of the scrolls 71. The rotor 41 is also provided with an axially extending passage 45 which communicates with a transverse bore or chamber 46. A pair of reciprocating plungers 47 are slidably received in the transverse bore 46.

Referring now to FIGURE 3, in conjunction with FIGURE 1, it will be observed that the rotor 41 is provided with flats 48 which are slidably received within a central cross slot 50 formed in the drive member 4. Also mounted in the slot 50 are push pieces 51 comprising followers 52, the radially outermost ends of which rotatably mount rollers 54. The plungers 47 are free to move independently of the followers 52 in an axial direction such that the entire rotor 41 may move axially to accomplish metering and governing functions which will be described in greater detail at a later point in the description.

An annular cam 56 is fixedly mounted in the pump housing outwardly of the drive member 4. Rotation of the drive member 4 drives the rotor 41, followers 52, and rollers 54 such that the latter will contact and run against the cam 56. The inside diameter of the cam 56 is provided with a plurality of raised lobe portions 58, and as the rollers 54 pass over the lobe portions the plungers 47 will be moved inwardly thereby compressing the fuel in chamber 46. The centrifugal force of the components just described, as well as the fuel pressure being built up against the plungers 47, will tend to maintain them in their outermost positions.

The compression of the fuel in chamber 46 will cause fuel to be directed through passage 45 past a delivery valve 60, out a passage 62, milled slot 64, a passage 66, and to a conventional fuel injection valve of the engine (not shown) through a port or line 68. During this period the passage 40 and a passage 72 are closed as will be described in greater detail below.

At the end of each delivery period of the fuel pump, as pressure is relieved by virtue of the scrolls 71, the delivery valve 60 will close by the force of a spring 61 to thereby maintain a predetermined static pressure in the fuel lines and associated fuel injection valves. A passage 70 is provided to allow retraction of fuel and reduction of pressure from passage 66 as the delivery valve 60 closes. In this manner a slight reduction of pressure in fuel line 68 will allow the fuel injection valve (not shown) to close quickly.

Several fuel lines 68 (generally eight, as in an eight cylinder engine) are located around the upper periphery of the fuel pump although only one such line is shown in the drawing. As the rotor 41 rotates, the slot 64 which is carried thereby will be exposed to each fuel line 68 separately. The slot 64 is constructed so as to ensure its opening into the various passages 66 prior to the inward movement of the reciprocating plungers 47 and after fuel spill-off from the scrolls 71. This fuel spill-off will be described in greater detail at a later point in the description.

The scrolls 71 on the rotor 41 are also arranged to correspond with each passage 66 leading to the fuel injection valves. It should be noted that in order to simplify the drawing, the passages leading to and from the rotor 41 have been shown out of their true plane. It should also be observed that during the delivery period the passage 40 and a passage 72 (to be described in detail later) are closed by the scrolls 71. During the interval when slot 64 is between a pair of passages 66, or as the injection period is cut off, the passages 40 and 72 will again be opened to the rotor passages 44 and 45.

When passage 72 is opened to the rotor, fuel will be forced past a check valve 74 (which is biased by a spring 76, the compression of which can be adjusted by a set screw 78) into passages 80 and 82. From passage 82 the fuel flows into a chamber 84 at the top end of the rotor 41. As the chamber 84 fills with fuel and pressure builds up therein from the spill pressure of the fuel injector plungers 47, rotor 41 acting as a piston is forced downwardly against the force of a balancing spring 86 formed in a bore 87 of the drive member 4. In this manner, the scrolls 71 (more clearly shown in FIGURE 4) will be positioned axially with respect to passage 72 causing a variation in the duration of pump delivery.

In FIGURE 4 the phantom outline ports referenced 72a and 72b represent the port 72 in its different positions with respect to the scrolls 71 formed on the axially movable rotor 41. It should be observed that the tapered portion 73 of the scrolls 71 will allow the pressure to be spilled off sooner (after the delivery) as the rotor 41 is moved downwardly under the pressure build-up in chamber 84. Therefore, as the engine speed increases and the fuel flow increases into the chamber 84, pressure in this chamber will increase and force the rotor 41 downwardly, thereby altering the fuel rate and governing the engine.

To maintain a desired level of fuel pressure in chamber 84 so as to control the speed of the engine, a valve which uses a sliding rod 88, as shown in FIGURE 5, is used to control the flow of fuel out of chamber 84. Since passages 80 and 82 have a common supply, pressure in chamber 84 and a chamber 90 will be equal.

Fuel will flow from the chamber 90 through a cylindrical opening 92 formed by a close fit (in the range of 0.003″ on the radius) between rod 88 and a bore 94 into an annular groove 96 formed on rod 88. From the groove 96 fuel flows through longitudinal passages 98 to a passage 100 where it is returned to a source of supply (not shown).

The length of cylindrical opening 92 will establish the rate at which the fuel will flow from chamber 90. The length of the cylindrical opening 92 is determined by the operator moving a lever 102 through a shaft 104 which is connected through a suitable linkage (not shown) to a manual control located at the operator's station. As the lever is rotated it will bear against an end 106 and of rod 88 which is maintained in its outermost position by a spring 108.

In operation, as the cylindrical opening 92 is lengthened the pressure drop across the opening increases, thereby increasing the pressure of the fuel in chamber 84 to force the rotor 41 downwardly to cause spill-off sooner which results in a decrease in engine speed. Conversely, as the cylindrical opening 92 is shortened, the pressure drop decreases and the rotor 41 moves upwardly lengthening the duration of the injection delivery and increasing the engine speed.

A set screw 110 is used to provide the high idle setting (top r.p.m.) and a set screw 112 to determine the low idle setting of the governor and fuel pump. Looking once again at FIGURE 1, the full load position of the fuel pump is determined by an adjusting screw 114. To this screw is mounted a suitable bearing 116 which will bear against a bolt head 118 when the rotor 41 is at its upper or full load position.

As a safety relief, a by-pass pasage 120 (FIGURE 1) is provided in the rotor 41 to prevent excessive pressure in the pump that would cause it to fail. For instance, when the fuel pump is used on a vehicle and the vehicle is coasting with the throttle closed, such as in a downhill situation, the fuel buildup from the injection plungers 47 might exceed the capacity of the throttle valve cylindrical opening 92 (FIGURE 5) which will be in a low idle or essentially closed position. Therefore, as the rotor is forced downwardly from the buildup of fuel pressure in chamber 84, when the passage 120 is opened to the slot 50, the fuel pressure will be spilled therein and returned to the source of supply via a suitable connecting line (not shown).

A variable timing mechanism may be provided as shown in FIGURE 6. In FIGURE 6, the drive between member 4' and the rotor 41' is provided by a weight and spring mechanism generally indicated at 122. As the drive member 4' rotates it will drive a weight 124 which is carried in a slot 126 formed in the drive member, The weight 124 in turn drives the rotor 41' by means of a slanted pin 128 which is suitably secured to the rotor 41' and upon which the weight is free to slide. As engine speed increases, the centrifugal force imparted to the weight 124 will move it outwardly against the force of a spring 129 and against the angle of pin 128 changing the respective angular position between the rotor 41' and the drive member 4'.

In this manner the period of injection is advanced. As the engine speed decreases, the weight will be returned inwardly again by the force of the spring thereby repositioning the rotor 41' with respect to drive member 4' to an intermediate position or the position shown in FIGURE 6.

To prevent the weight from solidly contacting rotor 41', a Belleville spring 130 is utilized which will also maintain a zero balance between itself and spring 129. In addition, a curved seat 53 is provided on the follower 52' to maintain the pumping stroke of the plungers 47' regardless of their angular position with respect to the followers.

FIGURES 7 and 8 illustrate a modified drive for the opposed plunger distributor fuel pump of the instant invention. As shown in FIGURE 7, a drive shaft 140 is rotatably supported in the fuel pump housing 142. A coupling device, generally indicated at 144, is drivingly connected to the drive shaft by integral pins 146 closely received in holes 148 formed in drive shaft 140. The pins are an integral part of a circular plate 150 which is mounted within a counter-bore 152 formed on the end of the drive shaft 140. On the opposite side of the plate 150, are two integral tangs 154 that engage slots 156 formed in the fuel pump rotor generally indicated at 158.

As can be more clearly seen in FIGURE 8, as the drive shaft 140 rotates the coupling device 144, rotary motion is imparted to the rotor 158. In so doing, the rotor, supporting the follower and roller assemblies 160 in slots 162, rotates the follower assemblies so that they intermittently contact lobes 164 formed on a cam ring 166. This causes reciprocation of the plungers 168 in turn causing fuel to be pumped to the distributing head, as previously described in connection with FIGURE 1. The coupling device 144 allows for some flexibility between the drive shaft and the rotor and also permits translatory or axial movement of the rotor 158 for a governing function as previously described with respect to FIGURE 1.

Figure 11:
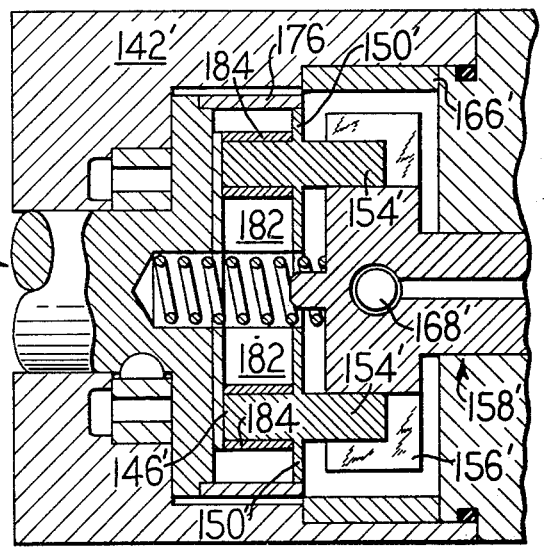
FIGURE 11 is a sectional view taken on a horizontal plane extending through the center of the device shown in FIGURE 10, said section being revolved 90° counterclockwise to facilitate comparison with the section shown in FIGURE 9.
Figure 10:
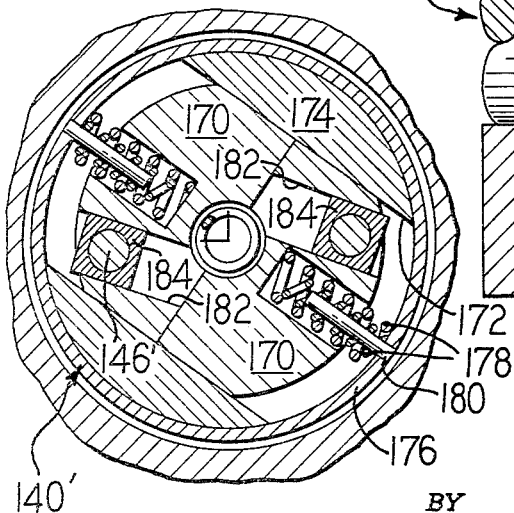
FIGURE 10 is a cross-sectional view taken on the line X—X of FIGURE 9.

A further modification of the drive shown in FIGURES 7 and 8, to permit a variable timing function, is shown in FIGURES 9 through 11. In the arrangement of FIGURES 9 through 11 flyweights 170 are positioned between the drive shaft 140' and the coupling device 144'. As can be best seen in FIGURE 10, two weights 170 are slidably mounted in a slot 172 which is machined into a circular portion 174 of the drive shaft 140'. A retaining ring 176 is positioned around the circumference of shaft portion 174 to limit the outward travel of the weights 170 and to provide a mounting location for biasing springs 178 and guide pins 180.

In a manner similar to that shown in FIGURE 7, the pins 146' (see FIGURE 11) are an integral part of a circular plate 150' and on the opposite side of the plate 150' there are two integral tangs 154' that engage slots 156' formed in the fuel pump rotor generally indicated at 158'. As noted in FIGURE 10 the flyweights 170 are each provided with an inclined slot 182. Button-like members 184 are rotatably mounted on the pins 146' to provide a good bearing surface between the slots 182 and the pins 146'.

In operation, at low speeds the springs 178 will maintain the weights 170 in the position shown in FIGURE 10. As engine speed increases, centrifugal force on the weights 170 causes them to move outwardly. As the weights move outwardly, they force the button-like members 184 to rotate by virtue of the inclined slot 182 formed in the weights 170. Thus, the outward movement of the weights 170 changes the relative angular position between the drive shaft 140' and the rotor 158' and this relative change in position between these two members is altered in proportion to engine speed. In this manner the injection period will be changed with respect to piston location.

It should further be observed that the variable timing mechanism shown in FIGURES 9 through 11 differs from that shown in FIGURE 6 in that the modification of FIGURES 9 through 11 not only changes the position of the scrolls 71 with respect to the spill port 72, but also changes the timing of the follower-roller assemblies 160' and pumping members 168' with respect to the cam ring 166'.

While we have illustrated and described the preferred embodiments of our invention, it is to be understood that these are capable of variation and modification and we therefore do not wish to be limited to the precise details set forth, but desire to avail ourselves of such changes and alterations as fall within the purview of the following claims.

We claim:
1. A method of governing an internal combustion engine through a rotary distributor fuel pump, said pump having a rotor mounted for rotary and axial movement in a fuel pump housing, biasing means for maintaining said rotor in a predetermined axial position within said housing, at least one plunger slidably mounted in a transverse bore near a first end of said rotor, actuating means surrounding said rotor for imparting inward movements to said plunger during rotation of said rotor, said method comprising:

rotating said rotor and supplying fuel at a substantially constant pressure to a rotor inlet port which communicates with a rotor passage for moving said plunger outwardly towards said actuating means;

closing said rotor inlet port;

actuating said plunger to inject fuel out of said rotor passage to an engine cylinder;

opening a spill port on said rotor which terminates fuel injection;

directing said spill pressure fuel from said rotor spill port against said rotor in a direction opposite to the force of said biasing means;

controlling the pressure of said spill pressure fuel directed against said rotor whereby the fuel spill measure determines the direction and extent of axial movement of said rotor; and, utilizing said axial movement of said rotor to control the volume of fuel spilled through said spill port, and, correspondingly, the volume of fuel injected to the engine cylinders, thereby governing the speed of the engine.

2. A rotary distributor fuel pump comprising:

a housing having a plurality of ports adapted for connection respectively to a plurality of engine cylinders;

a main bore extending longitudinally through said housing;

a rotatable drive member received in a first end of said main bore;

a rotor closely received in said main bore and having a first end drivably connected to said drive member for rotation therewith;

said rotor having a construction which will selectively permit axial movement of said rotor with respect to said main bore and said drive member while said rotor is rotating;

a transverse opening provided near said first end of said rotor;

at least one plunger slidably mounted in said transverse opening;

actuating means surrounding said rotor for imparting radially inward movements to said plunger during rotation of said rotor;

passages provided in said housing and said rotor so that, during rotation of said rotor, liquid fuel under pressure can be fed to said transverse opening for moving said plunger outwardly towards said actuating means and can be subsequently injected through said ports, in turn, by inward movement imparted to said plunger by said actuating means;

means permitting one of said group of passages in said housing to have periodic fluid communication with a chamber formed by a closed wall near the second end of said main bore and a second end of said rotor, so that upon pressure build-up in said chamber said rotor overcomes the force of a biasing means, which normally tends to diminish said chamber, and axially moves said rotor toward said drive member; and, means on said rotor allowing an increase in fuel flow to said chamber as said rotor axially moves towards said drive member and consequently decreasing fuel flow discharged through said ports to thereby govern engine speed.

3. In a rotary distributor fuel pump for a multi-cylinder internal combustion engine having a housing provided with a plurality of ports adapted for connection respectively to a plurality of engine cylinders;

a main bore extending longitudinally through said housing;

a rotor mounted in said main bore for both reciprocating and rotating movement;

said rotor having a construction which will selectively permit reciprocal movement of said rotor with respect to said main bore while said rotor is rotating;

a transverse opening provided near a first end of said rotor;

at least one plunger slidably mounted in said transverse opening;

actuating means surrounding said rotor for imparting radially inward movements to said plunger during rotation of said rotor;

passages provided in said housing and said rotor so that, during rotation of said rotor, liquid fuel under pressure can be fed to said transverse opening for moving said plunger outwardly towards said actuating means and can be subsequently injected through said ports, in turn, by inward movements imparted to said plunger by said actuating means;

the improvement comprising:

means for reciprocating said rotor to govern engine speed; and means for advancing and retarding the rotor rotationally to provide variable timing to the fuel injection cycle.

4. A rotary distributor fuel pump as set forth in claim 3 and further comprising:

a drive shaft adjacent to and coaxial with said rotor;

cooperating parts on the rotor and the drive shaft engageable to impart rotation of the drive shaft to said rotor;

said drive shaft having a portion formed on the end thereof adjacent said rotor which is provided with at least one radial aperture in alignment with said transverse opening;

a radially movable push piece slidably mounted in said radial aperture to bear against an adjacent end of said movable push piece to contact said actuating means during rotation of said rotor;

said advancing and retarding means including means for moving said rotor and associated pumping plunger angularly relative to said push pieces to thereby vary the timing of fuel injection through the ports associated with the engine cylinders.

5. A rotary distributor fuel pump as set forth in claim 4 wherein said means for providing variable timing to said fuel injection cycle comprises a slot formed in said drive member and a movable weight slidably received in said slot and connected to said rotor by a slanted pin, biasing means associated with said slanted pin for normally urging said weight to a position in said slot adjacent said rotor whereby an increase in rotational speed of said rotor increases the centrifugal force on said weight to overcome the force of said biasing means and moves said weight radially outwardly along the angle of said slanted pin to thereby impart relative angular movement between said rotor and said drive shaft.

6. A rotary distributor fuel pump as set forth in claim 3 and further comprising:

a radially movable push piece slidably mounted in said transverse opening radially outwardly of said plunger and bearing against an adjacent end of said plunger;

a drive shaft adjacent to and coaxial with said rotor;

cooperating parts on the rotor and the drive shaft engageable to impart rotation of the drive shaft to said rotor;

said advancing and retarding means including means associated with said cooperating parts on the rotor and drive shaft for rotating said rotor and associated pumping assembly relative to said drive shaft to provide variable timing for the injection of fuel through said ports associated with the engine cylinders.

7. A rotary distributor fuel pump as set forth in claim 6 wherein said means for providing variable timing to said fuel injection cycle comprises a movable weight slidably received in a transverse slot provided in said drive shaft, biasing means normally urging said movable weight radially inward towards the center of said drive shaft, an inclined slot extending radially outwardly through said movable weight, a button-like member slidably received in said inclined slot, a pin member rotatably mounting said button member, said pin integrally connected to a plate member which is free to rotate relative to said drive shaft, tang elements extending from the opposite side of said plate member, slot means formed on said rotor for closely receiving said tang elements whereby as engine speed increases centrifugal force moves the weights outwardly causing the inclined slots formed therein to rotate said button members and thereby change the relative angular position between said drive shaft and said rotor assembly.

References Cited

UNITED STATES PATENTS

| 3,131,604 | 5/1964 | Orshansky | 103—38 X |
|---|---|---|---|
| 3,166,063 | 1/1965 | Schettler. | |
| 3,189,013 | 6/1965 | Lee. | |
| 3,196,796 | 7/1965 | Channing et al. | |
| 3,219,020 | 11/1965 | Roosa. | |
| 3,311,100 | 3/1967 | Maddalozzo | 123—140 |
| 3,338,168 | 8/1967 | Davis. | |
| 3,416,505 | 12/1968 | Barber. | |
| 3,433,159 | 3/1969 | Kemp. | |

DONLEY J. STOCKING, Primary Examiner

W. J. KRAUSS, Assistant Examiner

U.S. Cl. X.R.

103—2

PO-1050
(5/69)

UNITED STATES PATENT OFFICE
CERTIFICATE OF CORRECTION

Patent No. 3,485,225      Dated December 23, 1969

Inventor(s) J. M. Bailey et al

It is certified that error appears in the above-identified patent and that said Letters Patent are hereby corrected as shown below:

Column 1, line 60, "persent" should be --present--

Column 4, line 56, "pasage" should be --passage--

Claim 1, Column 6, lines 44-45 "measure" should be --pressure--

SIGNED AND
SEALED
JUN 23 1970

(SEAL)
Attest:

Edward M. Fletcher, Jr.
Attesting Officer

WILLIAM E. SCHUYLER, JR.
Commissioner of Patents